(12) United States Patent
Jiang et al.

(10) Patent No.: US 11,258,368 B2
(45) Date of Patent: Feb. 22, 2022

(54) RESONANT CONVERTER CIRCUIT WITH SWITCHING FREQUENCY CONTROL BASED ON INPUT VOLTAGE

(71) Applicant: Monolithic Power Systems, Inc., San Jose, CA (US)

(72) Inventors: Jian Jiang, Los Gatos, CA (US); Di Han, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 41 days.

(21) Appl. No.: 16/898,207

(22) Filed: Jun. 10, 2020

(65) Prior Publication Data
US 2021/0391800 A1    Dec. 16, 2021

(51) Int. Cl.
*H02M 3/335* (2006.01)
*H02M 3/00* (2006.01)
*H02M 1/00* (2006.01)
*H02M 1/08* (2006.01)

(52) U.S. Cl.
CPC ..... *H02M 3/33569* (2013.01); *H02M 1/0016* (2021.05); *H02M 3/01* (2021.05); *H02M 1/0058* (2021.05); *H02M 1/083* (2013.01)

(58) Field of Classification Search
CPC ............. H02M 1/4242; H02M 3/01; H02M 2001/0058; H02M 1/0058
See application file for complete search history.

(56) References Cited

U.S. PATENT DOCUMENTS

| | | | |
|---|---|---|---|
| 2012/0020118 A1* | 1/2012 | Takaki | H02M 3/33507 363/16 |
| 2015/0349627 A1* | 12/2015 | Lin | H02M 3/337 363/21.02 |
| 2018/0301995 A1* | 10/2018 | Chang | H02M 3/33569 |
| 2020/0007043 A1 | 1/2020 | Miao | |
| 2020/0028345 A1* | 1/2020 | Roy | H02H 7/20 |
| 2021/0119546 A1* | 4/2021 | Deboy | H02M 3/337 |

\* cited by examiner

*Primary Examiner* — Peter M Novak
(74) *Attorney, Agent, or Firm* — Perkins Coie LLP

(57) ABSTRACT

A control method for regulating the switching frequency of a resonant converter having an input terminal to receive an input voltage and an output terminal to output an output voltage. The control method is sensing the input voltage and adjusting the switching frequency based on the comparison of the input voltage with a reference threshold voltage. When the input voltage is less than the reference threshold voltage, the switching frequency is adjusted to decrease, and when the input voltage is higher than the reference threshold voltage, the switching frequency is adjusted to increase.

5 Claims, 5 Drawing Sheets

RESONANT CONVERTER CIRCUIT WITH SWITCHING FREQUENCY CONTROL BASED ON INPUT VOLTAGE

TECHNICAL FIELD

This disclosure relates generally to a power converter, and more particularly but not exclusively relates to feedforward control of a resonant converter with open-loop.

BACKGROUND

In order to obtain ever-increasing power density of switched-mode power supplies, resonant converters are widely used in power management applications for their good performance in regards to switching losses and noise.

FIG. 1 illustrates a resonant converter 100 with a close loop control while FIG. 2 illustrates a resonant converter 200 with an open loop control. In FIG. 1, the output information of a secondary stage of the resonant converter 100 is fed back to a primary stage of the resonant converter 100 by an optical coupler, which limits the application fields, such as the automotive field or some other fields with high reliability requirement. In the meanwhile, the usage of the optical coupler increases the cost of the resonant converter 100. In FIG. 2, the output information of a secondary stage of the resonant converter 200 is not fed back to a primary stage of the resonant converter 200, the output voltage $V_{OUT}$ varies with the input voltage $V_{IN}$, thus the resonant converter 200 has poor line regulation performance.

Therefore, it is desired to provide a resonant converter that can provide good line regulation performance to meet high power quality requirements with an open loop control.

SUMMARY

In accomplishing the above and other objects, the specification provides a control method for a resonant converter in accordance with an embodiment of the present invention. The control method for regulating the resonant converter having an input terminal to receive an input voltage and an output terminal to output an output voltage, wherein the resonant converter comprises a resonant tank with a characteristic resonant frequency, a switch module having two or more power switches operating at a switching frequency to drive the resonant tank, a transformer having a primary winding and a secondary winding, and a rectifying circuit, and wherein the resonant tank is coupled between the switch module and the primary winding of the transformer, the rectifying circuit is coupled between the secondary winding of the transformer and the output terminal, the control method comprises sensing the input voltage, and then adjusting the switching frequency based on the comparison of the input voltage with a reference threshold voltage. Wherein when the input voltage is less than the reference threshold voltage, the switching frequency is adjusted to decrease.

The specification also provides a control circuit for regulating a resonant converter in accordance with an embodiment of the present invention. The control circuit for regulating a resonant converter having an input terminal to receive an input voltage and an output terminal to output an output voltage, wherein the resonant converter comprises a resonant tank with a characteristic resonant frequency, a switch module having two or more power switches configured to drive the resonant tank, wherein the switch module operates at a switching frequency, a transformer having a primary winding and a secondary winding and a rectifying circuit, and wherein the resonant tank is coupled between the switch module and the primary winding of the transformer, and the rectifying circuit is coupled between the secondary winding of the transformer and the output terminal, the control circuit comprises a clock generator and a frequency adjusting circuit, wherein the clock generator is configured to generate a clock signal to drive the switch module, the frequency of the clock signal is the switching frequency. The frequency adjusting circuit is coupled to the input terminal to sense the input voltage and configured to provide an error signal to the clock generator to adjust the frequency of the clock signal based on the comparison of the input voltage with a reference threshold voltage, wherein when the input voltage is less than the reference threshold voltage, the frequency of the clock signal is adjusted to decrease.

The specification also provides a resonant converter in accordance with an embodiment of the present invention. The resonant converter has an input terminal to receive an input voltage and an output terminal to output an output voltage. The resonant converter comprises a transformer having a primary winding and a secondary winding, a switch module having two or more power switches, a resonant tank coupled between the switch module and the primary winding of the transformer, a rectifying circuit which is coupled between the secondary winding of the transformer and the output terminal, a clock generator which is configured to generate a clock signal to drive the switch module to be operating at the switching frequency, and a frequency adjusting circuit which is coupled to the input terminal to sense the input voltage and configured to adjust the frequency of the clock signal based on the comparison of the input voltage with a reference threshold voltage, wherein the frequency of the clock signal is the switching frequency. Wherein the switch module operates at a switching frequency, the resonant tank has a characteristic resonant frequency and is driven by the switch module. Wherein when the input voltage is less than the reference threshold voltage, the switching frequency is adjusted to decrease.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of the embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Where either a field effect transistor ("FET") or a bipolar junction transistor ("BJT") may be employed as an embodiment of a transistor, the scope of the words "gate", "drain", and "source" includes "base", "collector", and "emitter", respectively, and vice versa. Those skilled in the art should understand that the meanings of the terms identified above do not necessarily limit the terms, but merely provide illustrative examples for the terms.

Figure 1:
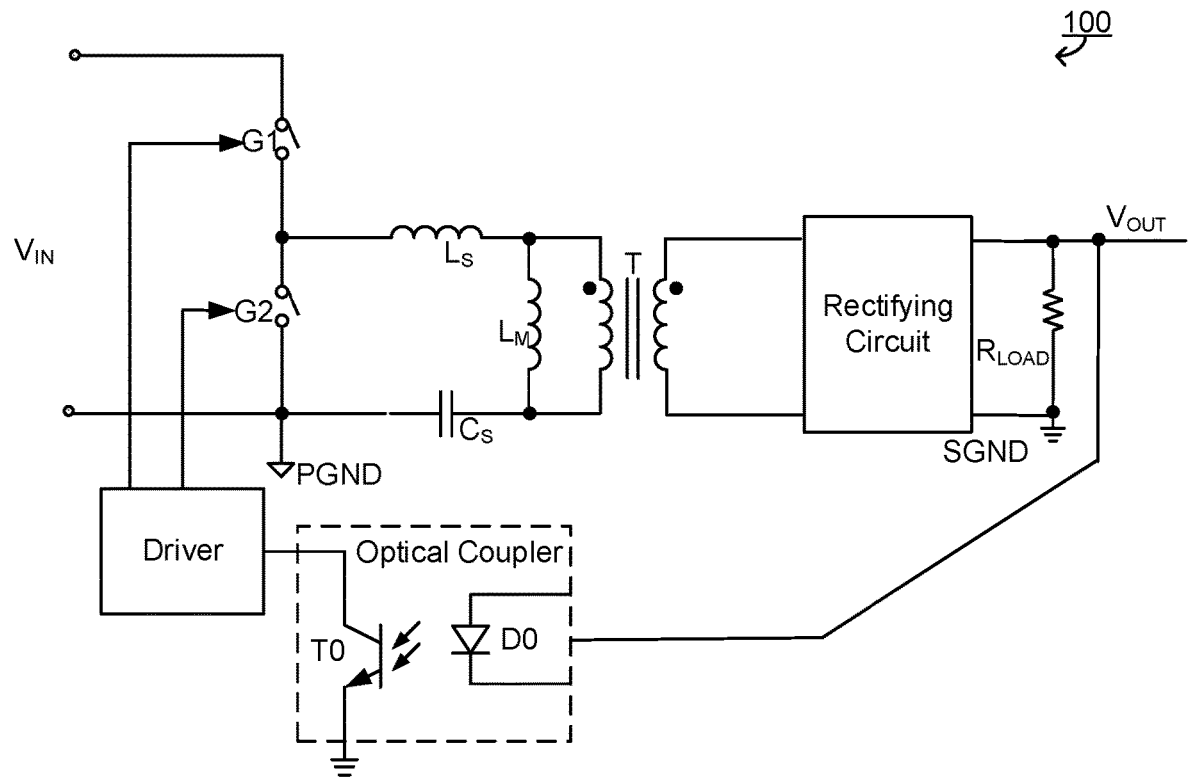
FIG. 1 illustrates a prior art resonant converter 100 with a close loop control.
Figure 2:
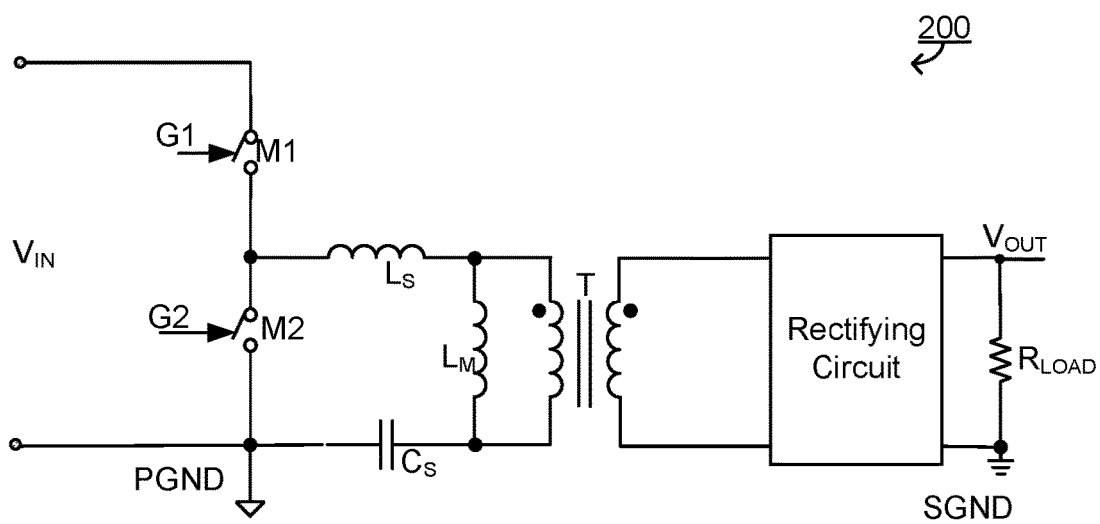
FIG. 2 illustrates a prior art resonant converter 200 with an open loop control.
Figure 3:
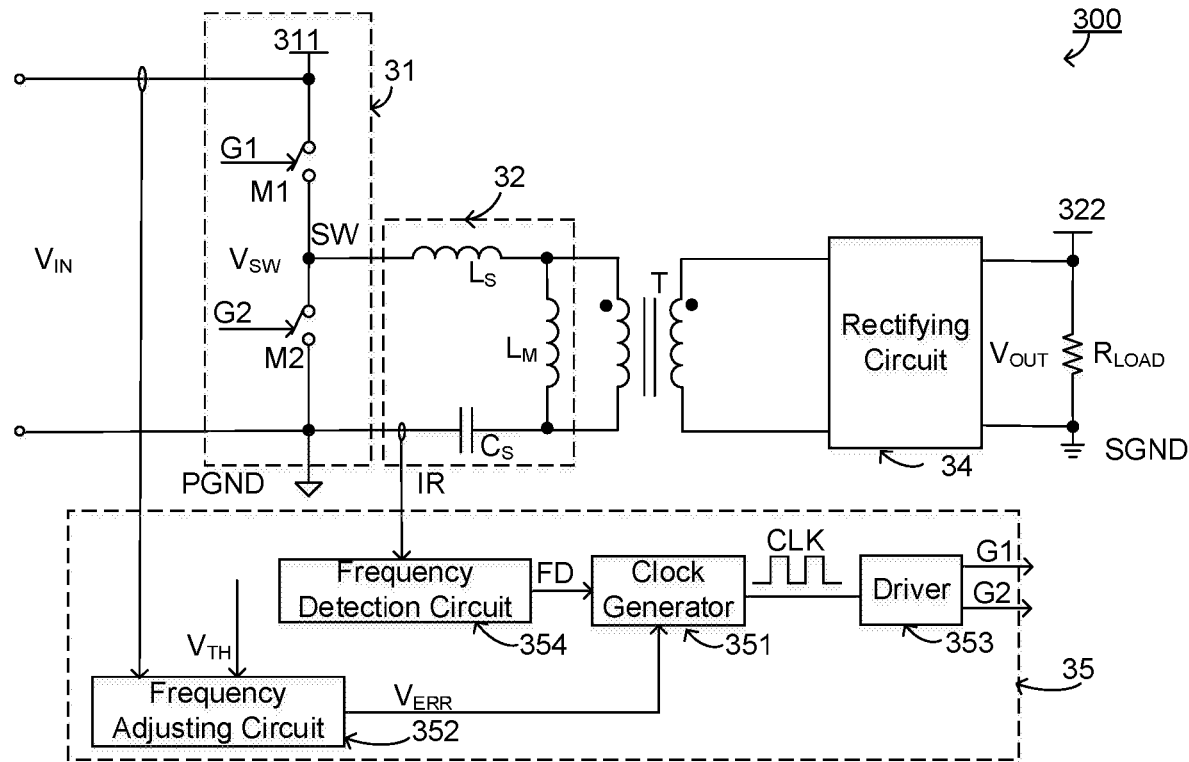
FIG. 3 illustrates a schematic diagram of a resonant converter 300 in accordance with an embodiment of the present invention.

FIG. 3 illustrates a schematic diagram of a resonant converter 300 in accordance with an embodiment of the present invention. The resonant converter 300 has an input terminal 311 to receive an input voltage $V_{IN}$ and an output terminal 322 to output an output voltage $V_{OUT}$. The resonant converter 300 comprises a switch module 31, a resonant tank 32, a transformer T having a primary winding and a secondary winding, a rectifying circuit 34 and a control circuit 35. The switch module 31 has a first power switch M1 and a second power switch M2 which are serially coupled between the input terminal 311 and a primary reference ground PGND. In an embodiment, the switch module 31 can be built as a full-bridge topology having more than two power switches. The resonant tank 32 is coupled between the switch module 31 and the primary winding of the transformer T while the rectifying circuit 34 is coupled between the secondary winding of the transformer T and the output terminal 322. The resonant tank 32 comprises a series inductor $L_s$, and a series capacitance $C_s$, which are serially coupled to the primary winding of the transformer T. The resonant tank 32 further comprises a magnetizing inductor $L_M$ which is coupled to the primary winding of the transformer T in parallel. In an embodiment, the inductance of the magnetizing inductor $L_M$ is 3-8 times of the inductance of the series inductor $L_s$. In another embodiment, the series inductor $L_s$ is realized by the leakage inductance of the transformer T, and the magnetizing inductor $L_M$ is realized by the magnetizing inductance of the transformer T. In an embodiment, the magnetizing inductor $L_M$ is implemented by introducing an air gap in the transformer T. The resonant tank 32 has a characteristic resonant frequency $F_R$ determined by the series inductor $L_s$ and the series capacitor $C_s$, where $$F_R = \frac{1}{2\pi\sqrt{L_S C_S}}.$$

One person with ordinary skill in this art should know that the resonant tank 32 is preferred to operate at the characteristic resonant frequency $F_R$. In an embodiment, the resonant tank 32 has at least an inductive element and a capacitive element. The rectifying circuit 34 provides the output voltage $V_{OUT}$ by rectifying an AC current $I_{AC}$ passing through the secondary winding of the transformer T with, for example, a rectifier diode and a rectifier capacitor. The rectifying circuit 34 can be implemented as a full-wave bridge or a center-tapped configuration with a capacitive output filter.

Still referring to FIG. 3, the control circuit 35 comprises a clock generator 351, a frequency adjusting circuit 352 and a driver 353. The clock generator 351 provides a clock signal CLK to the driver 353, and the driver 353 is configured to generate a first control signal G1 and a second control signal G2 based on the clock signal CLK. Further, the first control signal G1 and the second control signal G2 are provided to drive the switch module 31, and the switching frequency of the switch module 31 is changed by changing the frequency of the clock signal CLK. In an embodiment, the switching frequency is equal to the frequency of the clock signal CLK, that is, the frequency of the clock signal CLK is the switching frequency. More specifically, the first control signal G1 and the second control signal G2 are provided to the first power transistor M1 and the second power transistor M2 respectively. In an embodiment, the first power transistor M1 and the second power transistor M2 are controlled to conduct on and off switching complementarily by the first control signal G1 and the second control signal G2, i.e., when the first power switch M1 is switched on, the second power switch M2 is switched off, and vice versa. In an embodiment, a square wave voltage $V_{SW}$ is generated by driving the first power switch M1 and the second power switch M2 alternately with a substantial 50% duty cycle for each power switch. The frequency adjusting circuit 352 is coupled to the input terminal 311 to sense the input voltage $V_{IN}$ and configured to provide an error signal $V_{ERR}$ to the clock generator 351 to adjust the switching frequency based on the comparison of the input voltage $V_{IN}$ with a reference threshold voltage $V_{TH}$. When the input voltage $V_{IN}$ is less than the reference threshold voltage $V_{TH}$, the switching frequency is adjusted to decrease. In an embodiment, when the input voltage $V_{IN}$ is higher than the reference threshold voltage $V_{TH}$, the switching frequency is adjusted to increase. In another embodiment, when the input voltage $V_{IN}$ is less than the reference threshold voltage $V_{TH}$, the switching frequency is adjusted to decrease from the characteristic resonant frequency $F_R$. In an embodiment, when the input voltage $V_{IN}$ is less than the reference threshold voltage $V_{TH}$, the switching frequency is adjusted to decrease by a decrement, and when the input voltage $V_{IN}$ is higher than the reference threshold voltage $V_{TH}$, the switching frequency is adjusted to increase by an increment, the increment or the decrement of the switching frequency is proportional to the difference between the input voltage $V_{IN}$ and the reference threshold voltage $V_{TH}$. In an embodiment, the increment and the decrement of the switching frequency may have difference values. Yet in another embodiment, the increment and the decrement of the switching frequency may have the same value and are equal to $\Delta F$, wherein, $\Delta F = k|V_{IN} - V_{TH}|$, where $\Delta F$ is the variation of the switching frequency, $|V_{IN} - V_{TH}|$ is the absolute value of the difference between the input voltage $V_{IN}$ and the reference threshold voltage $V_{TH}$, and K is a scaling constant.

One of ordinary skill in the art should understand that the control circuit 35 and the resonant converter 300 described with reference to FIG. 3 are illustrative and not limiting. The control circuit 35 may allow the resonant converter 300 to have good line regulation performance without a close loop control (some application fields have high requirements on line regulation and reliability). And thus the output voltage $V_{OUT}$ is maintained at a substantial constant value by adjusting the switching frequency to vary according to the input voltage $V_{IN}$.

The control circuit 35 may further comprise a frequency detection circuit 354 configured to detect the characteristic resonant frequency $F_R$ of the resonant tank 32. The frequency detection circuit 354 is coupled to the resonant tank 32 and configured to generate a frequency detection signal FD indicative of the characteristic resonant frequency $F_R$. In an embodiment, the characteristic resonant frequency $F_R$ is derived by calculating through the equation $$F_R = \frac{1}{2\pi\sqrt{L_S C_S}}$$

based on the values of the series capacitor $C_s$ and the series inductor $L_s$.

Figure 4:
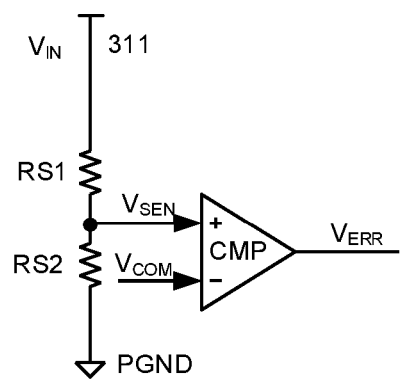
FIG. 4 illustrates an exemplary circuit diagram of the frequency adjusting circuit 352 in accordance with an embodiment of the present invention.

FIG. 4 illustrates an exemplary circuit diagram of the frequency adjusting circuit 352 in accordance with an embodiment of the present invention. The frequency adjusting circuit 352 comprises an input voltage sensing circuit and an error amplifier CMP. In FIG. 4, the input voltage sensing circuit comprises a first sensing resistor RS1 and a second sensing resistor RS2 which are serially coupled between the input terminal 311 and the primary reference ground PGND and provide a sense signal $V_{SEN}$ indicative of the input voltage $V_{IN}$ at the common node of the first sensing resistor RS1 and the second sensing resistor RS2. The error amplifier CMP has a first input terminal to receive the sense signal $V_{SEN}$, a second input terminal to receive a comparison threshold voltage $V_{COM}$ indicative of the reference threshold voltage $V_{TH}$, and an output terminal to output the error signal $V_{ERR}$ based on the sense signal $V_{SEN}$ and the comparison threshold voltage $V_{COM}$.

Figure 5A:
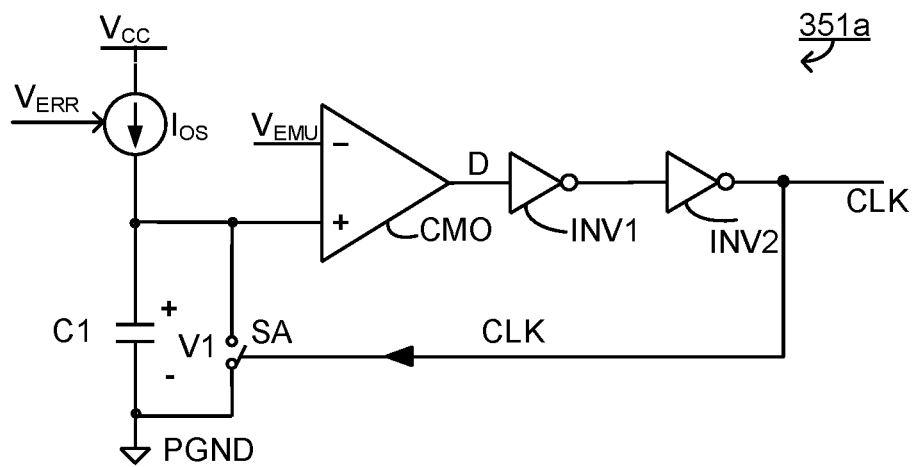
FIG. 5A illustrates an exemplary circuit diagram of the clock generator 351a in accordance with an embodiment of the present invention.

FIG. 5A illustrates an exemplary circuit diagram of the clock generator 351a in accordance with an embodiment of the present invention. The clock generator 351a is a controlled oscillator and comprises a current source for providing a charging current $I_{OS}$, a capacitor C1, a switch SA coupled in parallel with the capacitor C1, a comparator CMO, a first inverter INV1 and a second inverter INV2 which are coupled as FIG. 5A shows. The current source has a first terminal to receive a supply voltage Vcc and a second terminal. The capacitor C1 has a first terminal coupled to the second terminal of the current source, and a second terminal coupled to the primary reference ground PGND. The comparator CMO has a first input terminal to receive a reference signal $V_{EMU}$ and a second input terminal to receive a charging voltage signal V1 formed in the capacitor C1, and an output terminal to provide a comparison signal D to the first inverter INV1. The operation principle of the clock generator 351a will be explained as below. The charging voltage signal V1 keeps increasing as the charging current $I_{OS}$ charges the capacitor C1, the comparison signal D transits from logic low to logic high to turn on the first switch SA once the charging voltage signal V1 reaches the reference signal $V_{EMU}$. Then the charging voltage signal V1 is discharged to the primary reference ground PGND quickly and a new working cycle repeats. In FIG. 5A, the frequency of the clock signal CLK is adjusted by adding the error signal $V_{ERR}$ to control the current source. More specifically, when the input voltage $V_{IN}$ is less than the reference threshold voltage $V_{TH}$, the charging current $I_{OS}$ will be controlled to decrease by the error signal $V_{ERR}$, and a longer time is needed for the charging voltage signal V1 to increase to reach the reference signal $V_{EMU}$, thus the frequency of the clock signal CLK is decreased by the error signal $V_{ERR}$. When the input voltage $V_{IN}$ is higher than the reference threshold voltage $V_{TH}$, the charging current $I_{OS}$ will be controlled to increase by the error signal $V_{ERR}$, and a shorter time is needed for the charging voltage signal V1 to increase to reach the reference signal $V_{EMU}$, thus the frequency of the clock signal CLK is increased by the error signal $V_{ERR}$.

Figure 5B:
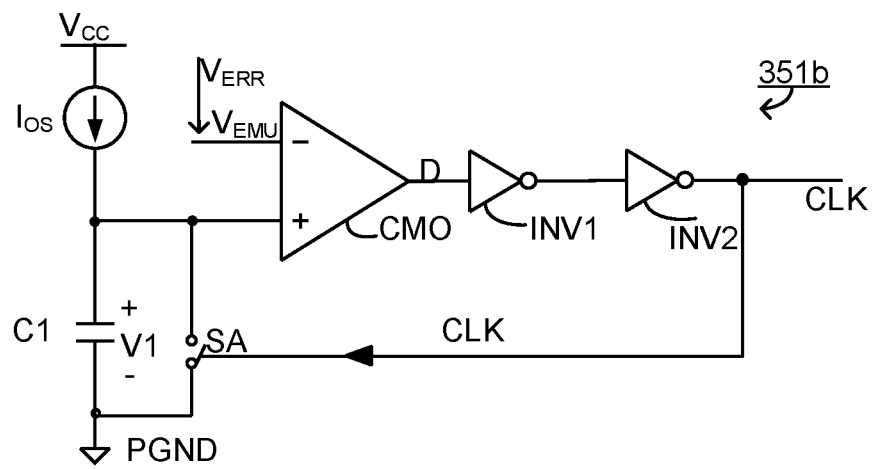
FIG. 5B illustrates an exemplary circuit diagram of another clock generator 351b in accordance with embodiment of the present invention.

FIG. 5B illustrates an exemplary circuit diagram of another clock generator 351b in accordance with another embodiment of the present invention. The clock generator 351b is similar to the clock generator 351a. However, the clock signal CLK's frequency in FIG. 5B is adjusted by adding the error signal $V_{ERR}$ to control the reference signal $V_{EMU}$. More specifically, when the input voltage $V_{IN}$ is less than the reference threshold voltage $V_{TH}$, the reference signal $V_{EMU}$ will be controlled to increase to a higher value by the error signal $V_{ERR}$, and a longer time is needed for the charging voltage signal V1 to increase to reach the reference signal $V_{EMU}$, thus the frequency of the clock signal CLK is decreased by the error signal $V_{ERR}$. When the input voltage $V_{IN}$ is higher than the reference threshold voltage $V_{TH}$, the reference signal $V_{EMU}$ will be controlled to decrease to a lower value by the error signal $V_{ERR}$, and a shorter time is needed for the charging voltage signal V1 to increase to reach the reference signal $V_{EMU}$, thus the frequency of the clock signal CLK is increased by the error signal $V_{ERR}$.

Figure 6A:
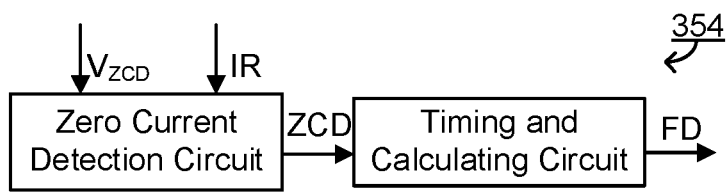
FIG. 6A illustrates an exemplary frequency detection circuit 354 in accordance with an embodiment of the present invention.

FIG. 6A illustrates an exemplary frequency detection circuit 354 in accordance with an embodiment of the present invention. In FIG. 6A, the frequency detection circuit 354 comprises a zero current detection circuit, and a timing and calculating circuit. The zero current detection circuit is coupled to the resonant tank 32 to sense a resonant current passing through the resonant tank 32 and further configured to generate a zero current signal ZCD based on the resonant current. More specifically, the zero current detection circuit is configured to generate a resonant current signal IR indicative of the sensed resonant current passing through the resonant tank 32 and further configured to generate the zero current signal ZCD by comparing the resonant current signal IR with a cross-zero threshold signal $V_{ZCD}$. The timing and calculating circuit is coupled to the zero current detection circuit and configured to generate a frequency detection signal FD indicative of the characteristic resonant frequency $F_R$ by timing and calculating the period $T_{ZCD}$ of the zero current signal ZCD. One person with ordinary skill in this art should know that every circuit that can perform the function described above is suitable to the present invention, so the detailed function description and specific structures of the zero current detection circuit and the timing and calculating circuit are not illustrated here for simplicity.

Figure 6B:
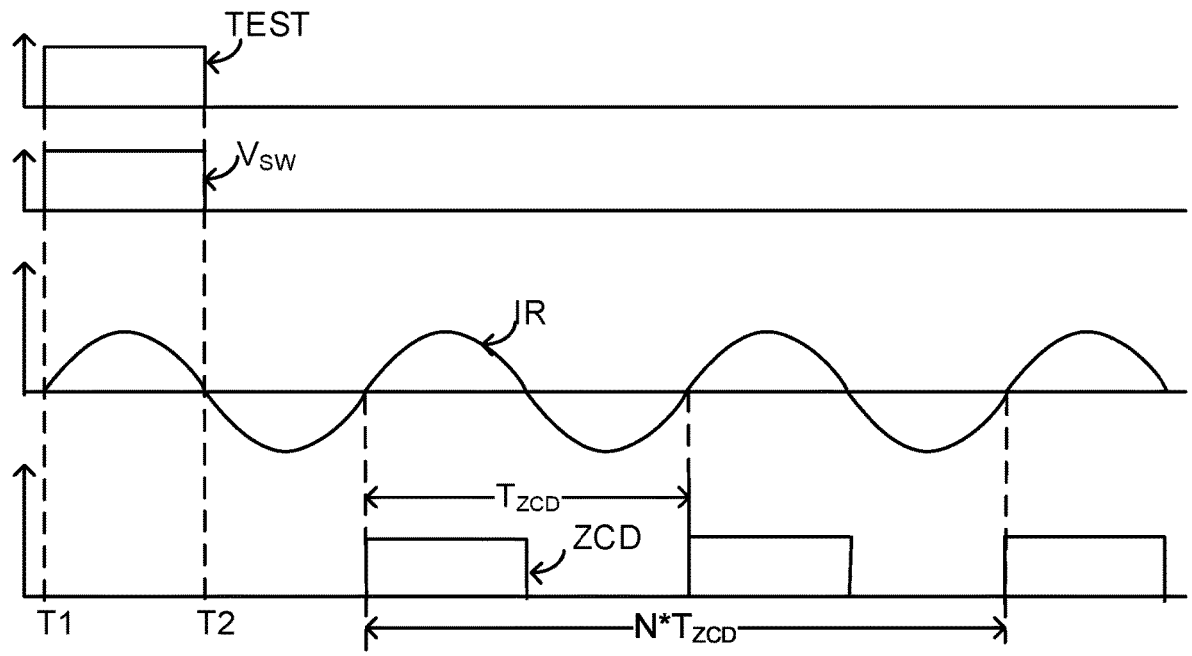
FIG. 6B illustrates the waveform of the frequency detection circuit 354 shown in FIG. 6A in accordance with an embodiment of the present invention.

FIG. 6B illustrates the waveforms of the frequency detection circuit 354 shown in FIG. 6A in accordance with an embodiment of the present invention. The operation principle of the frequency detection circuit 354 shown in FIG. 6A and the waveforms shown in FIG. 6B will be explained with reference to the resonant converter 300. In FIG. 6B, a testing signal TEST is provided to the switch module 31 to turn the first power switch M1 and the second power switch M2 on or off when the output voltage $V_{OUT}$ substantially equals zero volt. In FIG. 6B, at the moment T1, the first power transistor M1 is turned on as a rising edge of the testing signal TEST comes, the first power transistor M1 maintains at the on state until a falling edge of the testing signal TEST comes at the moment T2. In an embodiment, the frequency detection signal FD can be obtained by timing and calculating one period $T_{ZCD}$ of the zero current signal ZCD while in some other embodiments, the frequency detection signal FD can be obtained by timing and calculating a plurality of periods $T_{ZCD}$ of the zero current signal ZCD (in FIG. 6B, the frequency detection signal FD is obtained by timing and calculating two periods $T_{ZCD}$ of the zero current signal ZCD). It should be known that, although the testing signal TEST shown in FIG. 6B is a pulse signal, any waveform that comes with at least a fast rising edge or a fast falling edge will suffice. In an embodiment, the testing signal TEST may be a square wave signal having a frequency much less than the characteristic resonant frequency $F_R$. In another embodiment, the frequency of the testing signal TEST is less than one tenth of the characteristic resonant frequency $F_R$.

Figure 7:
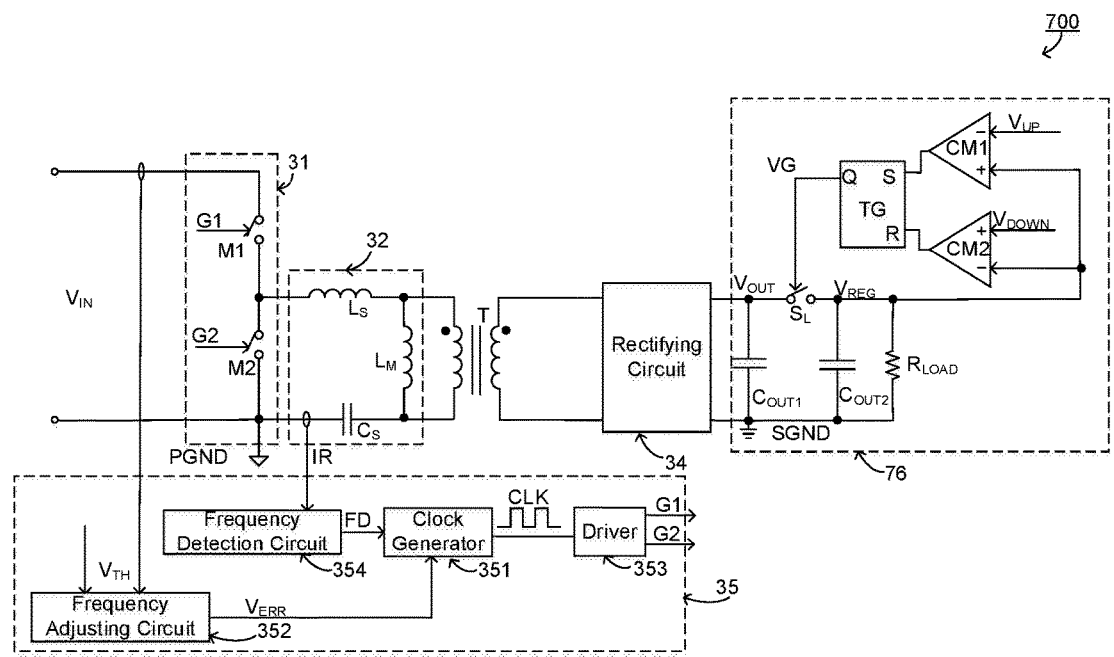
FIG. 7 illustrates a block diagram of another resonant converter 700 in accordance with another embodiment of the present invention.

FIG. 7 illustrates a block diagram of another resonant converter 700 in accordance with another embodiment of the present invention. The resonant converter 700 differs from the resonant converter 300 illustrated in FIG. 3 by the addition of an output regulation circuit 76 coupled to the rectifying circuit 34 for further converting the output voltage $V_{OUT}$ to a regulation voltage $V_{REG}$. In FIG. 7, the output regulation circuit 76 comprises a load switch $S_L$ having a first terminal and a second terminal, a first capacitor $C_{OUT1}$ coupled to the first terminal of the load switch $S_L$, a second capacitor $C_{OUT2}$ coupled to the second terminal of the load switch $S_L$, an up comparator CM1, a down comparator CM2 and a trigger TG, wherein the capacitance of the second capacitor $C_{OUT2}$ is higher than the capacitance of the first capacitor $C_{OUT1}$. The load switch $S_L$ is controlled by a gate signal $V_G$, and the first terminal of the load switch $S_L$ is configured to receive the output voltage $V_{OUT}$ while the second terminal of the load switch $S_L$ is configured to provide the regulation voltage $V_{REG}$. The operation principle of the output regulation circuit 76 will be explained below. When the regulation voltage $V_{REG}$ rises and reaches to an up threshold voltage $V_{UP}$, the load switch $S_L$ is controlled to be turned off, and when the regulation voltage $V_{REG}$ decreases to the down threshold voltage $V_{DOWN}$, the load switch $S_L$ is controlled to be turned on. In an embodiment, the first capacitor $C_{OUT1}$ is a parasitic capacitor. One of ordinary skill in the art should understand that the output regulation circuit 76 and the resonant converter 700 described in FIG. 7 are illustrative and not limiting. The output regulation circuit 76 may allow the resonant converter 700 to provide a regulation voltage $V_{REG}$ with a smaller ripple compared with the output voltage $V_{OUT}$, and thus advantageously get a voltage (the regulation voltage $V_{REG}$) with improved precision.

Figure 8:
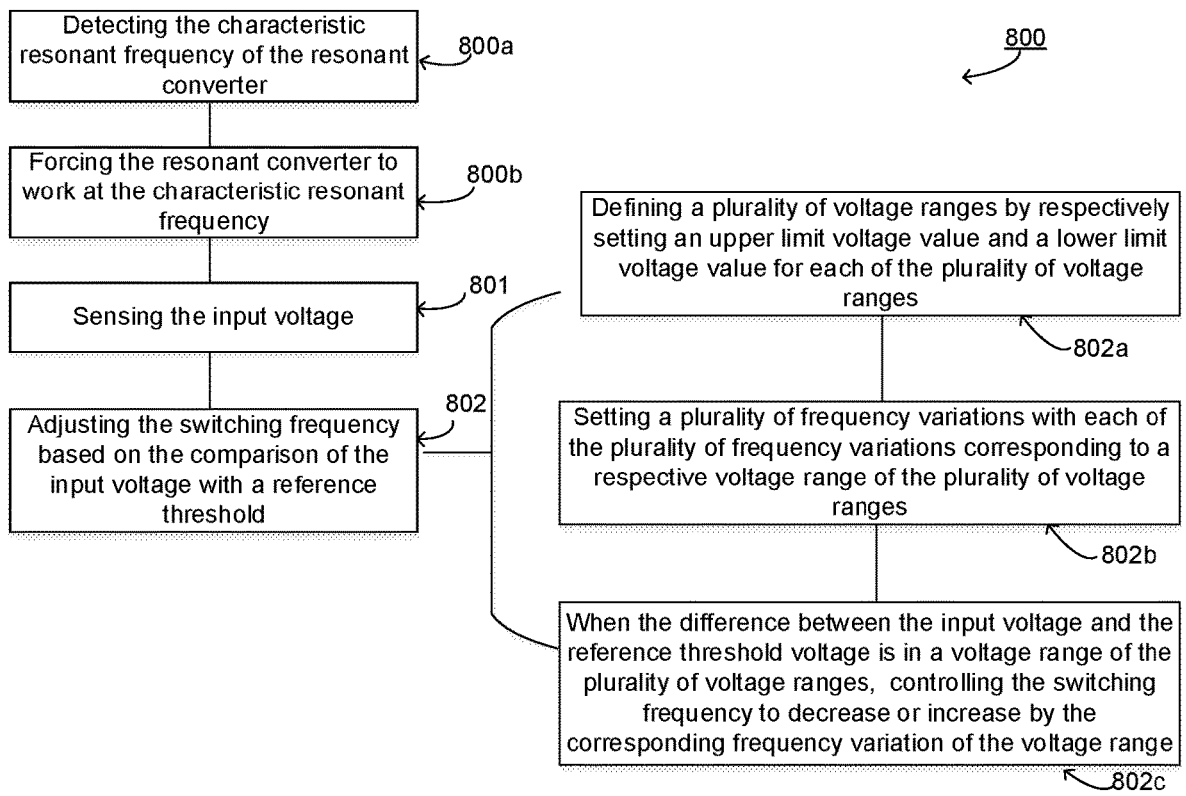
FIG. 8 illustrates a control method 800 for regulating a resonant converter in accordance with an embodiment of the present invention.

FIG. 8 illustrates a control method 800 for regulating a resonant converter in accordance with an embodiment of the present invention. Here, the control method 800 will be explained with reference to the resonant converter 300 illustrated in FIG. 3. The control method 800 comprises steps 801 and 802. In step 801, sensing the input voltage $V_{IN}$. In step 802, adjusting the switching frequency based on the comparison of the input voltage $V_{IN}$ with the reference threshold voltage $V_{TH}$, and more specifically, when the input voltage $V_{IN}$ is less than the reference threshold voltage $V_{TH}$, the switching frequency is adjusted to decrease. In an embodiment, when the input voltage $V_{IN}$ is higher than the reference threshold voltage $V_{TH}$, the switching frequency is adjusted to increase. In another embodiment, when the input voltage $V_{IN}$ is less than the reference threshold voltage $V_{TH}$, the switching frequency is adjusted to decrease from the characteristic resonant frequency $F_R$. In an embodiment, when the input voltage $V_{IN}$ is less than the reference threshold voltage $V_{TH}$, the switching frequency is adjusted to decrease by a decrement, and when the input voltage $V_{IN}$ is higher than the reference threshold voltage $V_{TH}$, the switching frequency is adjusted to increase by an increment, the increment or the decrement of the switching frequency is proportional to the difference between the input voltage $V_{IN}$ and the reference threshold voltage $V_{TH}$.

In an embodiment, step 802 comprises steps 802a-802c, in step 802a, defining a plurality of voltage ranges, wherein each of the plurality of voltage ranges is set by an upper limit voltage value and a lower limit voltage value. In step 802b, setting a plurality of frequency variations, wherein each of the plurality of frequency variations corresponds to a respective voltage range. In step 802c, when the difference between the input voltage $V_{IN}$ and the reference threshold voltage $V_{TH}$ is in a voltage range of the plurality of voltage ranges, adjusting the switching frequency to decrease or increase by the corresponding frequency variation of the voltage range. Table A shown below gives an exemplary description of the relation between the voltage ranges and the frequency variations in accordance with an embodiment of the present invention.

TABLE A

| Voltage Ranges | Upper Limit Voltage Value | Lower Limit Voltage Value | Frequency Variation |
|---|---|---|---|
| The Nth Voltage Range WN | VHN | VLN | XN% |
| The (N − 1)th Voltage Range W(N − 1) | VH(N − 1) | VL(N − 1) | X(N − 1)% |
| . . . | . . . | . . . | . . . |
| The i-th Voltage Range Wi | VHi | VLi | Xi% |
| . . . | . . . | . . . | . . . |
| The 2nd Voltage Range W2 | VH2 | VL2 | X2% |
| The 1st Voltage Range W1 | VH1 | VL1 | X1% |

The detailed workflow of step 802 will be explained with reference to Table A. Firstly, defining a plurality of voltage ranges WI-WN, wherein the i-th voltage range Wi has an upper limit voltage value VHi and a lower limit voltage value VLi. Then, setting a plurality of frequency variations X1%-XN %, wherein the i-th frequency variations Xi % corresponds to the i-th voltage range Wi. Then, when the input voltage $V_{IN}$ is less than the reference threshold voltage $V_{TH}$ and the difference between the input voltage $V_{IN}$ and the reference threshold voltage $V_{TH}$ is in the i-th voltage range Wi, adjusting the switching frequency to decrease by the corresponding frequency variation Xi %. It should be known that the frequency variation Xi % may be a constant or a variable. In the embodiments illustrated above, i is from 1 to N.

In an embodiment, the method 800 further comprises step 800a, detecting the characteristic resonant frequency $F_R$ of the resonant tank 32, and step 800b, forcing the resonant converter 300 to work at the characteristic resonant frequency $F_R$.

In an embodiment, the step of detecting the characteristic resonant frequency $F_R$ of the resonant tank 32 comprises: providing a test signal TEST to the switch module 31 to control the two or more power switches of the switch module 31 on or off when the output voltage $V_{OUT}$ substantially equals zero volt, and detecting a resonant current passing through the resonant tank 32 and generating a zero current signal ZCD based on the resonant current, and generating a frequency detection signal FD indicative of the characteristic resonant frequency $F_R$ based on the zero current signal ZCD. In an embodiment, the frequency detection signal FD can be obtained by timing and calculating one period $T_{ZCD}$ of the zero current signal ZCD while in some other embodiments, the frequency detection signal FD can be obtained by timing and calculating a plurality of periods $T_{ZCD}$ of the zero current signal ZCD.

The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A control method for regulating a resonant converter having an input terminal to receive an input voltage and an output terminal to output an output voltage, wherein the resonant converter comprises a resonant tank with a characteristic resonant frequency, a switch module having two or more power switches operating at a switching frequency to drive the resonant tank, a transformer having a primary winding and a secondary winding, and a rectifying circuit, and wherein the resonant tank is coupled between the switch module and the primary winding of the transformer, the rectifying circuit is coupled between the secondary winding of the transformer and the output terminal, the switching frequency is at the characteristic resonant frequency or near the characteristic resonant frequency, the control method comprising:

detecting the characteristic resonant frequency of the resonant tank;

sensing the input voltage; and adjusting the switching frequency based on the comparison of the input voltage with a reference threshold voltage;

wherein when the input voltage is less than the reference threshold voltage, the switching frequency is adjusted to decrease;

and wherein the step of detecting the characteristic resonant frequency of the resonant tank comprises:

providing a test signal to the switch module to control the two or more power switches on or off when the output voltage substantially equals zero volt;

detecting a resonant current passing through the resonant tank and generating a zero current signal based on the resonant current; and generating a frequency detection signal indicative of the characteristic resonant frequency based on the zero current signal.

2. The control method of claim 1, wherein the switching frequency is adjusted to decrease from the characteristic resonant frequency.

3. The control method of claim 1, wherein when the input voltage is higher than the reference threshold voltage, the switching frequency is adjusted to increase.

4. The control method of claim 3, wherein the step of adjusting the switching frequency based on the comparison of the input voltage with the reference threshold voltage comprises:

when the input voltage is less than the reference threshold voltage, the switching frequency is adjusted to decrease by a decrement, the decrement of the switching frequency is proportional to the difference between the input voltage and the reference threshold voltage; and when the input voltage is higher than the reference threshold voltage, the switching frequency is adjusted to increase by an increment, the increment of the switching frequency is proportional to the difference between the input voltage and the reference threshold voltage.

5. The control method of claim 3, wherein the step of adjusting the switching frequency based on the comparison of the input voltage with the reference threshold voltage comprises:

defining a plurality of voltage ranges by respectively setting an upper limit voltage value and a lower limit voltage value for each of the plurality of voltage ranges; and setting a plurality of frequency variations with each of the plurality of frequency variations corresponding to a respective voltage range of the plurality of voltage ranges;

wherein when the difference between the input voltage and the reference threshold voltage is in a voltage range of the plurality of voltage ranges, adjusting the switching frequency to decrease or increase by the corresponding frequency variation of the voltage range.

* * * * *